United States Patent [19]

Stol

[11] Patent Number: 4,529,466
[45] Date of Patent: Jul. 16, 1985

[54] SPLATTER ARRESTER FOR SURFACE-FASTENED FRANGIBLE ADHESIVE CAPSULE

[76] Inventor: Israel Stol, 639 Rocksprings Rd., Pittsburgh, Pa. 15228

[21] Appl. No.: 592,441

[22] Filed: Mar. 22, 1984

[51] Int. Cl.³ .................................................. B32B 31/00
[52] U.S. Cl. ..................................... 156/295; 156/71; 156/90; 156/92; 156/155; 156/291; 156/305; 156/310; 428/43; 428/65; 428/321.5
[58] Field of Search ............ 24/304, 478, 17 AP; 156/71, 90, 92, 155, 291, 295, 310, 305; 428/65, 43, 321.5; 206/813, 628

[56] References Cited

U.S. PATENT DOCUMENTS

| 3,085,024 | 4/1963 | Seemann | 206/813 |
| 3,861,979 | 1/1975 | Blackford | 428/43 |
| 4,153,156 | 5/1979 | Dzurilla | 156/295 |
| 4,273,827 | 6/1981 | Sweeney et al. | 428/321.5 |

Primary Examiner—George F. Lesmes
Assistant Examiner—P. R. Schwartz
Attorney, Agent, or Firm—Cushman, Darby & Cushman

[57] ABSTRACT

In order to prevent uncontrolled running, spreading and splattering by the adhesive contained in a surface-fastened frangible adhesive capsule as the capsule is smashed when two objects are brought together in a face-to-face manner while the capsule is disposed between them and has been preliminarily fastened on an interfacial surface of one of them, the capsule is ringed by a flacid plume of barrier material such as crepe paper, having a substantial thickness when unconfined, but which is subject to being compressed to insubstantial thickness. The barrier ring may be surface fastened to either of the interfacial surfaces and may be separate from or unitary with the capsule hanger.

10 Claims, 3 Drawing Figures

SPLATTER ARRESTER FOR SURFACE-FASTENED FRANGIBLE ADHESIVE CAPSULE

BACKGROUND OF THE INVENTION

In modern construction, refurbishing and home improvement projects there are many instances where the surface of one object needs to be fastened to the surface of another so that the second object covers and is supported by the first. An example is where wallboard, plywood, signage, sub-floor, or other useful or decorative paneling or the like, is adhered to studs, to furring strips, to lath, to joists, or to an existing sidewall, ceiling or floor surface such as one made of plaster, wallboard, sheathing panels, particle board, cinder block or the like.

Many and various are the kinds, constituencies and formulations of the adhesives which may be and are used for adhering. Whole books are written on the subject, e.g. S. Skeist, ed., *Handbook of Adhesives*, second edition, Van Nostrand Reinhold Company, New York 1977 (ISBN 0-442-27634-6). Of particular interest from this work are Chapter 49, R. J. Blomquist et al, "Adhesives for Building Construction", and Chapter 56, D. K. Rider, "Adhesives Guide for Designers". The patent literature is replete with teachings as to kinds, constituencies and formulations of adhesives, e.g. in T. J. Sweeney et al, U.S. Pat. No. 4,273,827, issued June 16, 1981.

The present invention has nothing to do with any new kind, constituency or formulation of adhesive, but simply with a new product and process which makes more convenient the use of many existing adhesives or ones hereafter developed for many instances where one object is to be adhered surfacewise to another.

Some adhesives in current use are very active, so that extreme caution is advised, for avoiding injury to the user. Potential problems include eye damage, skin burns, adhesion of clothing to the skin and of fingers to the work or to one another. Also a problem is inadvertent dripping, oozing, or running of adhesive onto finished surfaces, carpeting, furniture and the like in the vicinity of a do-it-yourself project, on into bearings or other moving parts of tools, power tools and machinery also being used on the project. Some do-it-yourselfers or potential do-it-yourselfers are believed to have a reluctance to engage in any project where they have to look at drops, beads or puddles of flowable liquid sticky material, perhaps out of the fear that they will get it on themselves, or otherwise make a mess that they do not want to have a clean up. What is needed is an adhesive applying means for the fastidious potential do-it-yourselfer, specifically a product that lets the user apply adhesive without ever having to look at it or worry about having to clean up a mess of it.

Some adhesives, e.g. cyanoacrylates such as those sold under the trade name "Superglue", which cure or set within five seconds or so upon exposure to air and/or upon being spread as a thin layer, are very difficult for one person to use working alone, especially where one large or heavy object needs to be stuck to a surface. The problem is that by the time the lone user gets a series of dots, beads, patches or a coat of the adhesive onto a sufficient area of one of the surfaces much of the adhesive is already substantially set, dry, reacted or the like and is no longer tacky or active. Accordingly, for such purposes, the quick-setting feature becomes a severe detriment rather than an advantage.

In my copending U.S. patent application Ser. No. 534,243, filed Sept. 21, 1983, I have described a surface-fastened frangible adhesive capsule wherein a quantum of liquid adhesive is encapsulated in an ampule-like frangible capsule. An instrumentality is provided by which the adhesive-containing capsule may be temporarily secured on one surface of two objects which are to be adhered together in a surface-to-surface manner. For instance, a foraminous paper band is looped around the capsule and thumbtacked to one of the objects. Several similar adhesive-containing capsules may be similarly temporarily secured on one or the other of the objects, these capsules being distributed in a pattern calculated to cause sufficient adhesion of the two surfaces upon application of the adhesive thereto. Then the two objects are placed in surface-to-surface, confronting relationship and one of the objects is pressed toward the other, for instance by tapping its accessible side with a hammer everywhere that there is an adhesive-containing capsule disposed on the now inaccessible side. Thus, each capsule is broken and its adhesive spread in a patch between the two surfaces, adhering the two objects together.

In the course of further developing that surface-fastened frangible adhesive capsule, I have come to believe that in certain instances, as the capsule is smashed, the adhesive may spread too far from where the capsule was surface mounted, and, as a result, too little of the adhesive may be available where it is wanted, and some may run or splatter out from between the two objects, i.e. from between a panel and the wall which the panel is being adhered to. The present invention is directed to ways and means for alleviating that possible shortcoming.

SUMMARY OF THE INVENTION

In order to prevent uncontrolled running, spreading and splattering by the adhesive contained in a surface-fastened frangible adhesive capsule as the capsule is smashed when two objects are brought together in a face-to-face manner while the capsule is disposed between them and has been preliminarily fastened on an interfacial surface of one of them, the capsule is ringed by a flacid plume of barrier material such as crepe paper, having a substantial thickness when unconfined, but which is subject to being compressed to insubstantial thickness. The barrier ring may be surface fastened to either of the interfacial surfaces and may be separate from or unitary with the capsule hanger.

The principles of the invention will be further discussed with reference to the drawing wherein preferred embodiments are shown. The specifics illustrated in the drawings are intended to exemplify, rather than limit, aspects of the invention as defined in the claims.

DETAILED DESCRIPTION

Figure 1:
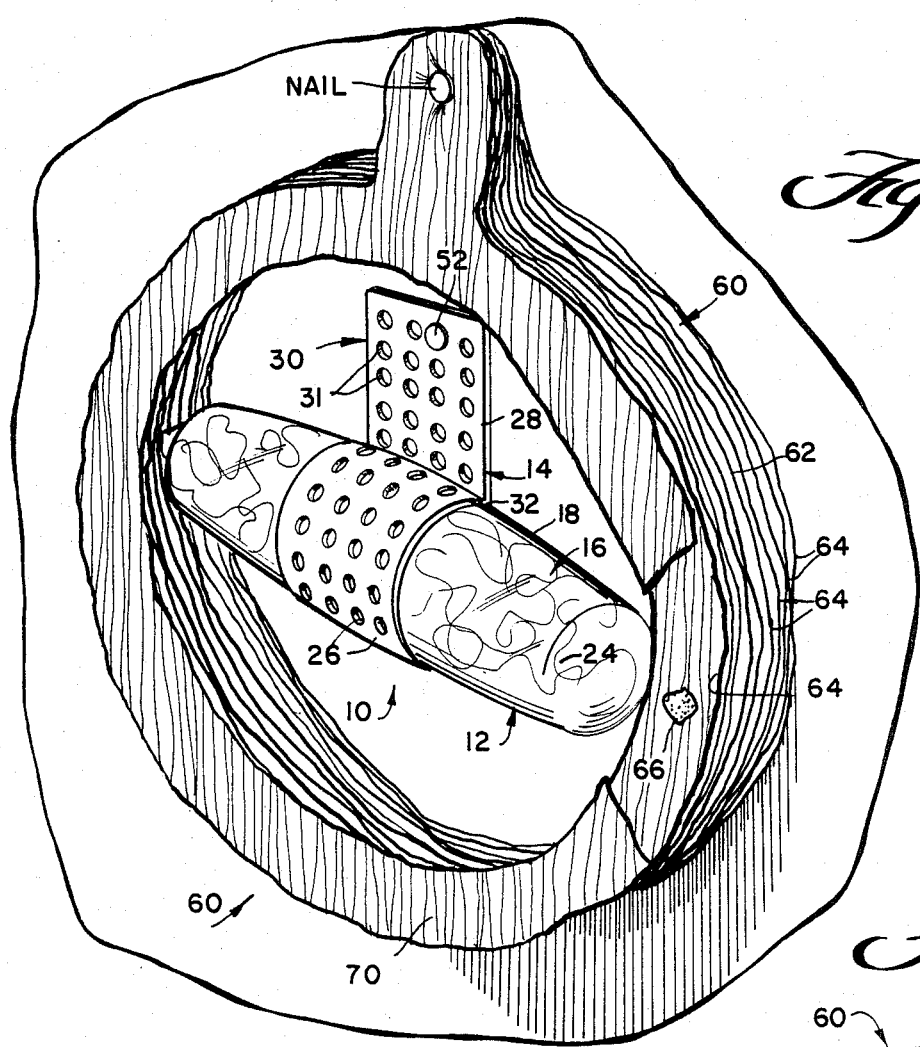
FIG. 1 is a perspective view of a frangible adhesive capsule preliminarily surface-fastened by means of a hanger to a surface which is to become an interfacial surface of a joint between two objects which will be fastened together by the adhesive now within the capsule. The capsule is shown ringed by a splatter arrester provided in accordance with principles of the present invention.

An embodiment of a surface-fastenable frangible adhesive capsule as disclosed in my aforesaid copending U.S. patent application Ser. No. 534,243, filed Sept. 21, 1983 is illustrated at 10 in FIG. 1. The product 10 is shown comprising two major parts, assembled together. These are the adhesive-filled frangible capsule 12 and the hanger 14.

The adhesive-filled frangible capsule 12 is shown including a macrocapsule per se 16 constituted by a liquid-tight, relatively thin wall means 18, which completely encloses a quantum of adhesive 20 which is in a liquid state. Although the wall means 18 could be made of many different sorts of materials, e.g. ceramic, natural or synthetic plastic resin, metal foil/paper laminate, plastic/foil laminate and the like, the presently preferred material is glass, particularly the same sorts of glass as are conventionally used in the manufacture of small, baseless, electric lightbulbs, and crushable ampules for therapeutic agents and other chemicals. And the technique used for filling then sealing the capsules may be substantially the same as is conventionally used for filling and sealing such ampules. An alternative material is hard gelatin capsules such as is used for encapsulating drugs, vitamins and the like, and the technique for filling and sealing can be substantially the same as is conventionally used for filling and sealing hard gelatin capsules with drugs, vitamins and the like. However, it is necessary when using such a material to first test whether the liquid adhesive will not attack the capsule wall leading to an unacceptably short shelf life for the product.

As to the liquid adhesive, no particular kind, composition or formulation is required for use in the product of the invention. It may be, as fluid as Superglue cyanoacrylate or as viscous as LePages library paste, or even more so in either extreme. Conventional polyvinyl acetate-based panel adhesive is another example of a useful adhesive. Virtually any adhesive which remains in a liquid state while isolated from the air or while in bulk and not as a thin film, and which is inert relative to the material of the capsule wall means may be used. Although each capsule 16 generally will have one internal chamber 22 filled with liquid adhesive, it would be possible to provide a plurality of internal chambers, at least two filled with different adhesive components, which would first come into contact upon breaking of the capsule.

In accordance with the indication above, the preferred material for the capsule wall 18 is glass. In order to ensure that the capsule wall 18 will comprehensively disintegrate upon being compressed, and not merely rupture at one local site and permit the contents to spurt unidirectionally, the capsule wall preferably is provided with a pattern or network of lines of weakness 24 over substantially all or at least a major portion of its surface area. These may be provided internally or externally, but usually it will be easier to provide them externally. The lines of weakness 24 may be provided by casting or molding them into the material of the capsule wall much in the way that an orthogonal network of grooves is formed in the cast iron jacket of a fragmentation grenade. Or they may be formed, e.g. after the capsule is filled and sealed, by a process of chemical etching or mechanical scribing. The presently preferred technique is to form the lines of weakness 24 by using the same laser inscription technique which recently has become conventional for inscribing ownership-indicating identification markings on gem stones. A comprehensive network of laser inscription lines 24 is shown formed on the capsule in FIG. 1, and a typical one is shown in section at a larger scale in FIG. 3.

The second major component of the product 10, as indicated above, is the hanger 14.

In the instance depicted, the filled capsule 12 takes the form of a prolate spheroid or ovoid and the hanger 14 takes the form of a circular band 26 with a tangentially extending tail 28, e.g. the "police whistle"-shape of a lower-case sigma. This hanger 14 may be generated by snuggly winding a strip of hanger material 30 convolutely slightly more than once about the girth of the filled capsule 12, fastening (e.g. gluing) it to itself in the overlap, at 32, and leaving the tail 28 free. The hanger material 30 may be made of paper tape such as is used for pre-punching messages to be sent on telex machines, or for ticker tape; surgical or wound-dressing tape; sheet plastic strip with pressure sensitive adhesive on one side, such as is used in the manufacture of Band-Aid, Curad and similar brands of such consumer products. By strong preference, the tape material 30 of the hanger 14 is very foraminous, i.e. covered with perforations 31, at least over the whole area of its circular band portion 26, so that when the filled capsule 12 is crushed, adhesive may flow out through the hanger, as well as out through the end regions where the broken capsule was not covered by the hanger. In other words it is preferred that the hanger 14 not form a significant barrier to the dispersion of the adhesive as the capsule is broken.

The tape material 30 preferably is kept as narrow as possible, e.g. being about a third as wide as the capsule is long. An especially long capsule could be similarly provided with two or more such hangers 14 spaced along its length. Each hanger 14 can be created in place, as described, or it could be preformed on a mandrel and later slipped onto the capsule either by the manufacturer or by the user.

In any event, the purpose of the hanger 14 is to temporarily fasten the filled capsule 12 onto the respective surface of one of the two objects which are to be adhered together using the product 10. Such a use is depicted in FIGS. 1 and 2, which respectively show the situation prior to and subsequent to crushing of the adhesive-filled capsule 12.

Figure 2:
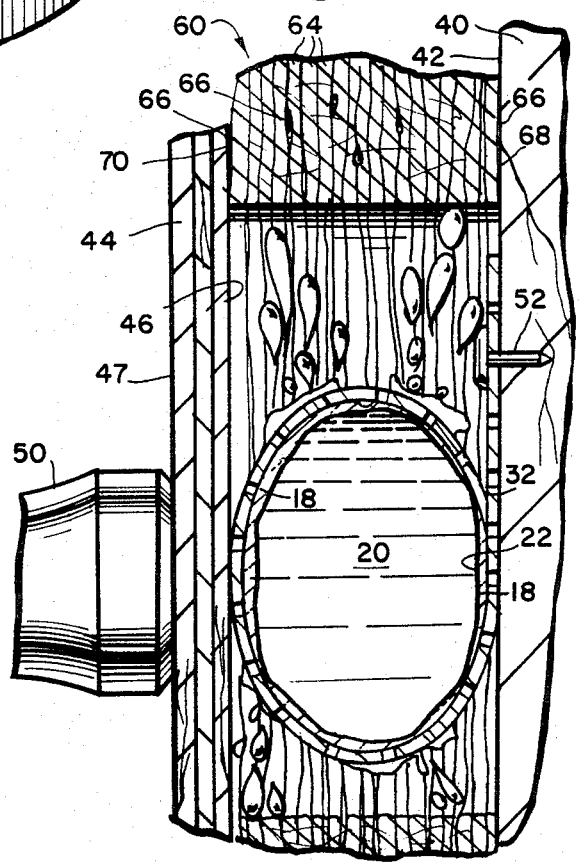
FIG. 2 is a cross-sectional view of the structure shown in FIG. 1 as the capsule of adhesive is being smashed.

In the typical situation shown in FIG. 2, the object 40 is a building stud, already installed, having an accessible outer surface 42. The object 44 is a structural and/or decorative panel, e.g. of plywood, particle board, acoustical tile, other composition board or the like, having an inner surface 46. An objective in completing the physical structure of which the object 40 is a part, is to mount the object 44 to the object 40 so that it, too, becomes a part of the same physical structure.

Accordingly, the first step is to mount the product 10 on either the surface 42 of the object 40 or on the surface 46 of the object 44. In most instances it will be easier to do the former than the latter, but either is possible. For instances where the object 44 is heavy, broad, tall or its surface 46 has a large area, it may be preferred to use several of the products 10 to mount the object to the structure represented by the object 40. In that case, strictly speaking, the one object 44 may need to be simultaneously fastened to a plurality of objects 40. That would be the case, for instance, when one four by eight foot sheet of plywood panelling needed to be fastened across four or eight wall studs. In that instance, one or more of the products 10 would be first mounted on each of the wall studs.

There are many convenient ways that the hanger 14 of a product 10 could be fastened on the surface 42 of the object 40. What is shown in FIG. 2 is that the tail 28 of the hanger 14 has been tacked to the stud 40, e.g. using a thumb tack 52, brad, staple or the like.

According to principles of the present invention in connection with the incident of fastening one or more of the products 10 on the surface 42 of the object 40, a splatter arrester 60 is mounted either on the surface 42 of the object 40 or on the surface 46 of the object 44 in such a location as to spacedly ring the respective capsule 16 and effectively occupy the full thickness of the space between the surfaces 42 and 46 beginning at least as early as the moment that the surface 46 contacts the capsule wall 18 or hanger band 26 of the product 10.

When each individual product 10 and each splatter arrester 60 which are going to be used are so mounted in place, and the object 44 is brought into confronting relation and proper alignment, as shown in FIG. 2, the object 44 is pressed toward the object 40, causing each capsule 12 to be crushed, fractured, smashed, disintegrated or the like. An expected result in the absence of use of the splatter arrester 60 would be an all-direction, two-dimensional splattering of the liquid adhesive contents of the respective capsule much in the pattern that a fresh egg in the shell makes when it is dropped onto a sidewall. However, in each instance where a splatter arrester 60 rings a respective capsule 12, uncontrolled running, spreading and splattering of the liquid adhesive is prevented by an intercepting barrier effect provided by the respective splatter arresters 60.

Each splatter arrester 60 preferably is constituted by a ring-shaped body 62 of barrier material that constitutes a lofty but relatively flacid plume in its unconfined state. In other words, when nothing is pressing on the body 62 in a sense to axially compress it, it is effectively relatively thick, but as force is applied to it in an axially compressive sense, it has so little substance and so little resistance to compression that its axial thickness correspondingly diminishes as the surface 46 is brought towards the surface 42. A typical, preferred constituency of the splatter arrester body 62 is several identical ring-shaped layers 64 of crinkled crepe paper tacked to one another at a plurality of angularly and radially distributed individual spots, e.g. by dots 66 of adhesive, or by securing or the like. The body 62 may be constructed and arranged to be mounted to a surface such as the surface 46 or 42, by having a layer of contact adhesive 66 applied to the exterior face of one end 68 thereof. This layer 66 may be continuous, or it may be applied as a plurality of individual lines, stripes, dots or the like. It is initially rendered unavailable, e.g. by a cover sheet of plastic-coated or waxed paper or the like (not shown), in the same manner that the contact adhesive on Band-Aid plastic strip bandages is prevented by a strippable cover sheet from prematurely sticking to anything until the cover sheet is stripped off. Accordingly, the splatter arrester 60 is mounted to the surface 42 or to the surface 46 in surrounding or potentially surrounding relation to a respective adhesive-filled capsule product 10 before the two objects 40 and 44 are brought together, e.g. by stripping off the cover sheet (not shown) and lightly applying the splatter arrester, sticky side first, to the surface 42 or 46 at the desired location.

In fact, in order to further ensure that the splatter arrester 60 occupies the whole thickness of the gap between the objects 40 and 44 during the crucial moments, the opposite end surface 70 of the body 62 may similarly be coated with a contact adhesive temporarily protected by a strippable cover sheet. Then, after the end 68 has been mounted to one of the surfaces 42 or 46, the cover sheet is stripped from the sticky surface 70, so that as the objects 40 and 44 are aligned and initially brought into confronting relation, the sticky surface 70 adheres the opposite end of the body 62 to the other of the surfaces 46 or 42.

In any event, after the surfaces 42 and 46 of the bodies 40 and 44 are brought into confronting relation, all of the products 10 may be smashed simultaneously by comprehensively pushing all of the object 44 towards the object 40, or they may be smashed serially, e.g. by tapping on the exposed outer face 47 of the object 44, e.g. using a hammer 50. In any event, as the capsule is or capsules are smashed, and the adhesive is thus released and flattened into a thin film, the object 44 becomes adhered facewise to the object 40 (FIG. 2). As the adhesive is released and spreads, each splatter arrester 60 which surrounds a respective body of spreading adhesive effectively acts as a barrier for limiting the extent to which adhesive may spread from the respective broken capsule.

As the adhesive is released from the smashed capsule, some of it will flow into and through the material 30 of the hanger 14, and some may flow into and become trapped within the respective splatter arrester 60 so that even though the hanger material 30 and splatter arrester 60 remain in the interface of the joint there is no potential weakness, e.g. represented by a possibility of tearing or delamination of the hanger material or splatter arrester.

The hanger 14 may be equipped to be fastened to the object 40 by having one face of its tail 28 provided with a layer of conventional pressure sensitive adhesive, e.g. much as the splatter arrester 60 as described above. And this layer may initially be provided with a strip-off cover sheet (not shown) much in the way that Band-Aid strips are. The layer of contact adhesive may function in place of or in addition to the mechanical fastener 52 of FIG. 2.

The hanger 14 and/or the splatter arrester 60 may be equipped to be fastened to a ferromagnetic object 40 by having one face of the tail 28 of the hanger 14, or one or both ends of the splatter arrester body 62 provided with a layer of permanent magnet coating material, e.g. such as is used on the backs of "magnetic darts" and on the backs of the similar magnetized objects that people use to post notes to themselves and others on their refrigerator doors.

The hanger 14 as shown is in its preferred form. However, it could have other forms, such as a tube of thermoplastic netting of the type used for bagging grapes at the supermarket, or a spot coating of pressure sensitive adhesive directly on one side of the capsule 12, or a small shot pellet-like permanent magnet encapsulated within the capsule 12, i.e. in the quantum of liquid adhesive. Or the adhesive-filled capsule 12 could be placed against the respective surface 42 of the object 40 and a small piece of ordinary Scotch Brand Magic transparent tape or the like sufficiently used as a hanger to tape the capsule temporarily in place.

Likewise, although the splatter arrester 60 is shown having its preferred form and constituency, alternatives are possible without departing from the principles of the present invention. As to constituency, rather than being made of one or more layers of crinkly paper such as crepe paper or similar material made of cellophane or other plastics sheeting, the splatter arrest may be made of a fleece, napped fabric, pile fabric, open cell foamed synthetic plastic resin, non-woven matted or interlaced fiber batting, down and/or feathers and the like.

While in the preferred embodiment the splatter arrester 60 as a unitary body completely rings the respective adhesive-filled capsule, each splatter arrester 60 could be constituted as an arcuate form, or as a bar-shaped form and one or several of these arranged in spaced juxtaposition with a respective adhesive-filled capsule for acting as a barrier against uncontrolled spreading of adhesive in the particular direction which is blocked by each respective splatter arrester.

The preferred means for mounting each splatter arrester 60 is pressure sensitive adhesive. However, any could be tacked into place, in the same way that the capsule hanger is shown tacked into place in FIGS. 1 and 2.

The radial width of the splattter arrester and its spacing from the capsule of adhesive are subject to variation depending on the nature of the adhesive and the size of the capsule. The radial width should be such that substantially all adhesive which encounters the splatter arrester is stopped from spreading radially outwardly beyond the splatter arrester. The free thickness of the splatter arrester preferably is such that the splatter arrester fully bridges the gap between the confronting surfaces 42 and 46 at the time that the capsule of adhesive begins to break. The compressed thickness of the splatter arrester should be such that the splatter arrester does not tend to significantly push the surfaces 42 and 46 apart once adhesive has been spread between them by breakage of the capsule.

Figure 3:
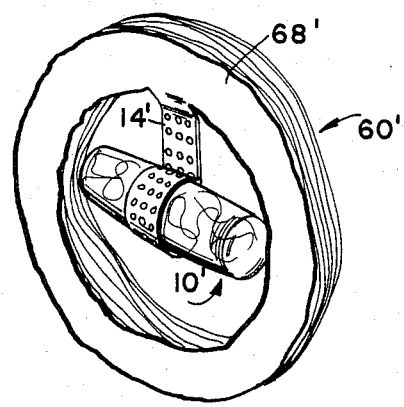
FIG. 3 is a smaller scale perspective view of a modified form in which the splatter arrester is provided as a unitary structure with the capsule hanger.

In the embodiment shown in FIG. 3, wherein like numerals have been used to designate comparable structure, but given primes to avoid confusion, the adhesive capsule product 10' and splatter arrester 60' are shown united into a single object by forming the end layer 68' of the splatter arrester as an integral extension of the hanger 14' of the adhesive capsule 12'. Accordingly, both the capsule and the arrester may be mounted together in one act, e.g. by stripping off a cover sheet and applying the end layer 68' sticky-side-first against the surface on which this unitary product is to be mounted. Even where the splatter arrester is a separate object from the adhesive-filled capsule with hanger product, both may be packaged together, for instance in blister packages containing instructions for intended use.

The term "splatter" is used herein in a generic sense to encompass sheets, runs or droplets which may be airborne and/or which may be running or spreading along either the surface 42 or the surface 46.

It should now be apparent that the splatter arrester for surface-fastened frangible adhesive capsule as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A fastener comprising, in combination,
a liquid adhesive-containing frangible capsule including means for fastening that capsule on one of two confronting surfaces on respective objects which are to be brought together in a face-to-face manner and secured together by smashing the capsule thus releasing the liquid adhesive; and
a splatter arrester for preventing uncontrolled splattering of the liquid adhesive as the respective objects are brought together in a face-to-face manner, said splatter arrester comprising:
a flacid plume of barrier material having a substantial thickness when unconfined but being subject to being compressed to insubstantial thickness; and
means for fastening said flacid plume of barrier material to one of said two confronting surfaces in spaced relation to said frangible adhesive capsule.

2. The fastener of claim 1, wherein:
said flacid plume of barrier material is arranged in the shape of a ring for spacedly perimetrically surrounding said frangible adhesive capsule.

3. The fastener of claim 2, wherein:
the flacid plume of barrier material when unconfined is at least as thick as said capsule when intact.

4. The fastener of claim 3, further including:
means physically joining said fastening means for said capsule with said fastening means for said flacid plume of barrier material thus uniting the liquid adhesive-containing frangible capsule and said splatter arrester into a unitary device.

5. A fastener comprising, in combination:
a surface fastenable adhesive capsule for use in adhering respective confronting surfaces of two objects together in a face-to-face manner, said surface fastenable adhesive capsule comprising:
a closed, frangible capsule containing a filling of liquid adhesive capable of adhering to respective faces of both of the objects; and
a hanger means carried by said adhesive-containing capsule and constructed and arranged for temporarily securing the adhesive-containing capsule to one of the objects with the adhesive-containing capsule disposed on the respective face of that object, so that after the adhesive-containing capsule has been temporarily secured to the one object, the other object may be brought into face-to-face confronting relation with the one object and the objects pressed together causing the adhesive-containing capsule to smash, and the adhesive to become released and spread between the two pressed-together objects, adhering the two objects together; and
a splatter arrester for preventing uncontrolled splattering of the liquid adhesive as the respective objects are brought together in a face-to-face manner, said splatter arrester comprising:
a flacid plume of barrier material having a substantial thickness when unconfined but being subject to being compressed to insubstantial thickness; and means for fastening said flacid plume of barrier material to one of said two confronting surfaces in spaced relation to said frangible adhesive capsule.

6. The fastener of claim 5, wherein:
said flacid plume of barrier material is arranged in the shape of a ring for spacedly perimetrically surrounding said frangible adhesive capsule.

7. The fastener of claim 6, wherein:
the flacid plume of barrier material when unconfined is at least as thick as said capsule when intact.

8. The fastener of claim 7, further including:
one of said objects having said liquid adhesive-containing capsule hung thereon by said hanger means and having said splatter arrester secured thereon by said fastening means in spacedly surrounding relation to said liquid adhesive-containing capsule.

9. A method for adhering two objects together in a face-to-face manner, comprising:
providing a closed, frangible capsule containing a filling of liquid adhesive capable of adhering to respective faces of both of the objects;
providing a hanger connected to the adhesive-containing capsule, and temporarily hangingly securing the adhesive-containing capsule onto a respective face of one of the objects using the hanger;
providing as a splatter arrester a flacid plume of barrier material having a substantial thickness when unconfined but being subject to being compressed to insubstantial thickness;
fastening said flacid plume of barrier material to one of said two objects in such a relative position that when the two objects are brought into face-to-face confronting relation, said flacid plume of barrier material will be spacedly juxtaposed with said liquid adhesive-containing capsule;
bringing the other object into face-to-face confronting relation with the one object; and
pressing the objects together so as to cause the adhesive-containing capsule to smash, and the adhesive to become released and spread between the two pressed-together objects, adhering the two objects together, with said splatter arrester being arranged to intercept and prevent over-spreading of the adhesive.

10. The method of claim 9, wherein:
said splatter arrester is arranged as a ring spacedly perimetrically surrounding said liquid adhesive-containing capsule.

* * * * *